United States Patent [19]

Meyers et al.

[11] Patent Number: 4,892,001

[45] Date of Patent: Jan. 9, 1990

[54] INTERLOCK ASSEMBLY FOR A VEHICLE TRANSMISSION

[75] Inventors: Richard S. Meyers, Jonesboro, Ark.; Charles R. Jones, Ottawa Lake, Mich.

[73] Assignee: Dana Corporation, Toledo, Ohio

[21] Appl. No.: 240,858

[22] Filed: Sep. 6, 1988

[51] Int. Cl.⁴ .......................... G05G 5/10; G05G 9/14
[52] U.S. Cl. ........................................ 74/477; 74/475; 267/150
[58] Field of Search .................... 74/473 R, 475, 476, 74/477, 491; 267/150; 137/625.69

[56] References Cited

U.S. PATENT DOCUMENTS

| | | | |
|---|---|---|---|
| 1,116,575 | 11/1914 | De Waters | 74/477 |
| 1,131,291 | 3/1915 | Thomas | 74/477 |
| 1,321,087 | 11/1919 | Church | 74/477 |
| 1,791,137 | 2/1931 | Manville | 74/477 |
| 1,830,797 | 11/1931 | Lapsley | 74/475 |
| 1,909,644 | 5/1933 | Westcott | 74/475 X |
| 1,948,723 | 2/1934 | Lapsley | 74/476 X |
| 2,425,204 | 8/1947 | Peterson et al. | 74/475 |
| 2,428,892 | 10/1947 | Plexico | 74/477 |
| 2,435,929 | 2/1948 | Plexico | 74/339 |
| 2,684,600 | 7/1954 | Naumann | 74/600 |
| 3,043,413 | 7/1962 | McAfee et al. | 192/98 |
| 3,192,788 | 7/1965 | Fodrea | 74/375 |
| 3,245,278 | 4/1966 | Mattausch | 74/333 |
| 3,473,566 | 10/1969 | Peppel | 137/625.69 X |
| 3,541,879 | 11/1970 | Ravenel | 74/477 |
| 3,866,488 | 2/1975 | Nakata et al. | 74/476 |
| 3,937,100 | 2/1976 | Huffman et al. | 74/476 |
| 4,228,693 | 10/1980 | Kelbel | 74/339 |
| 4,359,910 | 11/1982 | Numazawa et al. | 74/476 |
| 4,494,419 | 1/1985 | Inui et al. | 74/477 |
| 4,509,385 | 4/1985 | Inui et al. | 74/477 |
| 4,510,818 | 4/1985 | Inui | 74/477 |
| 4,510,819 | 4/1985 | Inui | 74/477 |
| 4,531,418 | 7/1985 | Takahasi et al. | 74/339 |
| 4,539,859 | 9/1985 | Arai et al. | 74/475 |
| 4,584,895 | 4/1986 | Holmes | 74/476 |
| 4,590,454 | 5/1986 | Zettergren | 74/473 R X |
| 4,605,109 | 8/1986 | Fukuchi et al. | 74/477 X |
| 4,660,730 | 4/1987 | Holmes | 74/491 X |

Primary Examiner—Allan D. Herrmann
Attorney, Agent, or Firm—MacMillan, Sobanski & Todd

[57] ABSTRACT

An interlock assembly for preventing more than one of a plurality of shift bars within a transmission shifter assembly from being moved out of a central neutral position at a given time is disclosed. An interlock bracket is connected to the lower end of the shift lever for movement therewith about a first or selecting axis. When the shift lever is moved so as to select a particular shift bar for movement, the interlock bracket moves therewith, thereby blocking movement of the non-selected shift bars. An interlock pin is connected to the interlock bracket for movement therewith. First and second springs are provided for urging the interlock pin, the interlock bracket, and the shift lever toward a centered position relative to the plurality of shift bars. The first spring resists movement of the shift lever out of the centered position in a first direction about the selecting axis, while the second spring resists movement of the shift lever out of the centered position in a second, opposite direction about the selecting axis. The first and second springs differ in size by a large amount so as to provide different magnitudes of tactile feedback to an operator of the shift lever. As a result, the operator can easily determine by "feel" which of the plurality of shift bars has been selected for subsequent movement to a gear engaging position.

24 Claims, 3 Drawing Sheets

INTERLOCK ASSEMBLY FOR A VEHICLE TRANSMISSION

BACKGROUND OF THE INVENTION

The present invention relates in general to shifting mechanisms for vehicle transmissions and in particular to an improved interlock assembly for preventing more than one of a plurality of shift bars within a transmission shifter &0 assembly from being moved out of a central neutral position at a given time.

In a typical multiple speed vehicle transmission, a shifter assembly is used for selecting a desired one of a plurality of gear ratios between an input shaft and an output shaft. A plurality of shift bars are provided within the shifter assembly for accomplishing this gear ratio selection. If, for example, the transmission is capable of five forward gear ratios and one reverse gear ratio, the shifter assembly usually includes three of such shift bars. The shift bars are typically oriented in parallel fashion adjacent to one another, each being supported for longitudinal movement in opposite directions from a central neutral position. Thus, each of the three shift bars is capable of being moved to two different gear engaging positions within the shifter assembly for use.

The shifter assembly further includes a gear shift lever, the upper end of which is manually operable by an operator of the vehicle. The lower end of the gear shift lever extends into the shifter assembly so as to cooperate with aligned notches formed on each of the shift bars. By moving the upper end of the shift lever about a first axis of movement (the selecting axis), the operator can move the lower end thereof into a single desired one of the aligned notches formed in the shift bars. This selecting movement of the shift lever does not move any of the shift bars out of their central neutral positions, but rather selects one of the shift bars for such movement. The operator can then actually move the selected shift bar out of its central neutral position into one of the two gear engaging positions by moving the upper end of the shift lever about a second axis of movement (the shifting axis). Generally, the shifting axis is transverse to the selecting axis.

Severe damage may occur to the components of the transmission if more than one of the shift bars is moved out of the central neutral position at any given point in time. Thus, it is important that the shifter assembly include some means for preventing this from occurring. To this end, it is known to provide an interlock assembly which, when one of the shift bars is initially selected for movement as described above, mechanically engages the other shift bars so as to prevent any movement thereof out the their central neutral positions.

Damage may also occur to the transmission if the shift bars are not moved in accordance with a predetermined sequence, i.e. if the gear ratios of the transmission are not properly selected. Such improper selection may occur inadvertently if the operator of the vehicle incorrectly moves the shift lever about the selecting axis. This situation occurs because the operator does not look down to visually determine the position of the shift lever, but rather relies upon the "feel" thereof when moving the shift lever. In the past, spring loaded mechanisms have been used in conjunction with the shift lever to provide tactile feedback to the operator as to the position thereof. Such mechanisms have also been provided to urge the shift lever toward a centered position relative to the shift bars. Unfortunately, such mechanisms have also been relatively complicated and expensive to manufacture.

SUMMARY OF THE INVENTION

The present invention relates to an improved interlock assembly for preventing more than one of a plurality of shift bars within a transmission shifter assembly from being moved out of a central neutral position at a given time. A manually movable shift lever has a lower end which extends into the shifter assembly so as to cooperate with notches formed on each of the shift bars. The interlock assembly includes an interlock bracket which is connected to the lower end of the shift lever for movement therewith about a first or selecting axis. When the shift lever is moved into any one of the notches so as to select that particular shift bar for movement, the interlock bracket moves therewith, extending into the notches of all of the other shift bars. Consequently, the interlock bracket mechanically blocks movement of the non-selected shift bars. An interlock pin is connected to the interlock bracket for movement therewith. First and second springs are provided for urging the interlock pin, the interlock bracket, and the shift lever toward a centered position relative to the plurality of shift bars. The first spring resists movement of the shift lever out of the centered position in a first direction about the selecting axis, while the second spring resists movement of the shift lever out of the centered position in a second, opposite direction about the selecting axis. The first and second springs differ in size by a large amount so as to provide different magnitudes of tactile feedback to an operator of the shift lever. As a result, the operator can easily determine by "feel" which of the plurality of shift bars has been selected for subsequent movement to a gear engaging position.

It is an object of the present invention to provide an improved interlock assembly for preventing more than one of a plurality of shift bars within a transmission shifter assembly from being moved out of a central neutral position at a given time.

It is another object of the present invention to provide such an improved interlock assembly which urges the shift lever toward a centered position relative to the plurality of shift bars.

It is a further object of the present invention to provide such an improved interlock assembly which generates different magnitudes of tactile feedback to an operator of the shift lever to permit the operator to easily determine by "feel" which of the plurality of shift bars has been selected for subsequent movement to a gear engaging position.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figure 1:
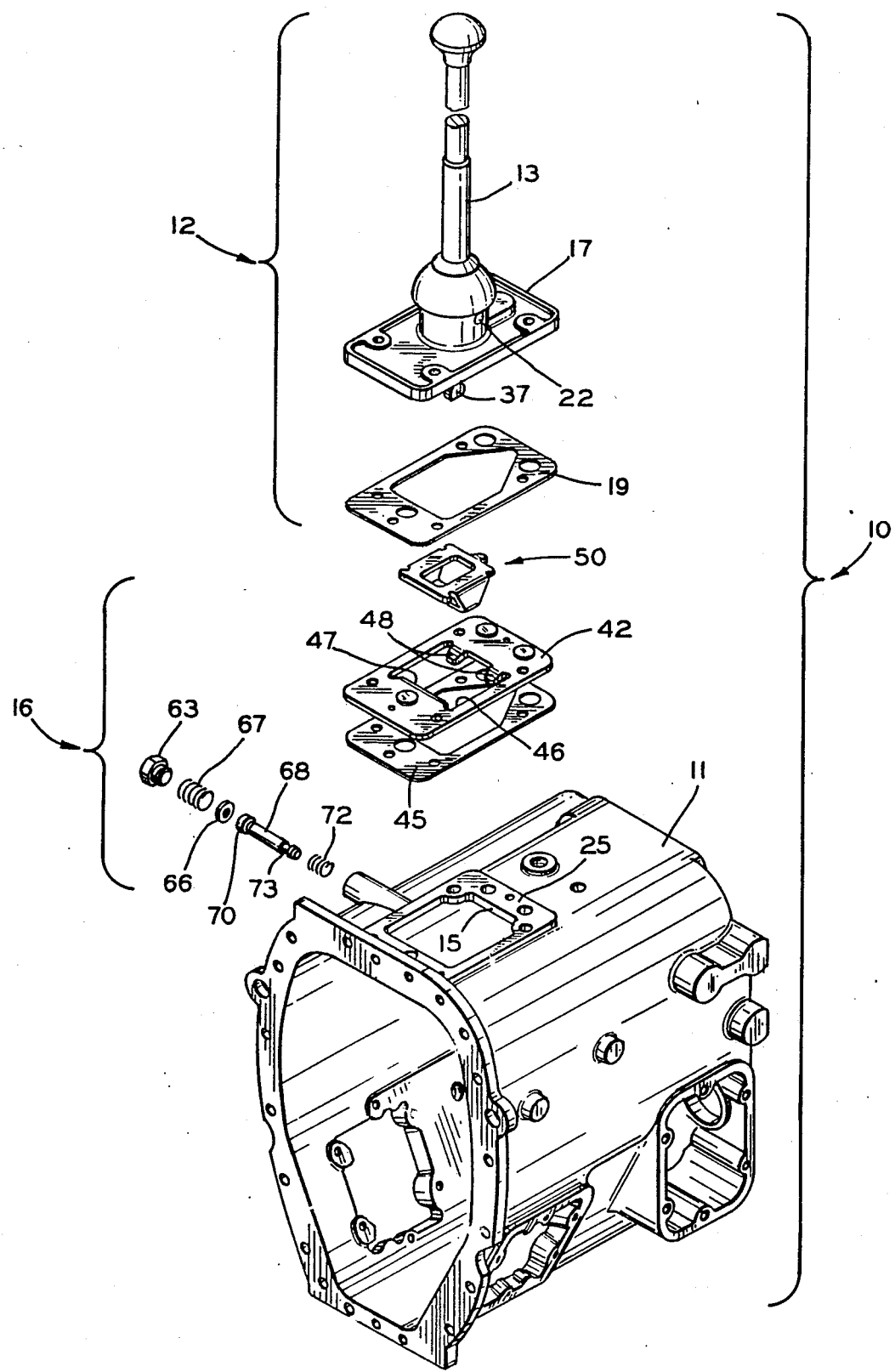
FIG. 1 is an exploded perspective view of a portion of a vehicle transmission including an interlock assembly in accordance with the present invention.

Referring now to the drawings, there is illustrated in FIG. 1 a portion of a vehicle transmission, indicated generally at 10. The transmission 10 includes a hollow case 11, within which most of the conventional gear selecting and shifting components (not shown) are enclosed. A shift lever and dome assembly, indicated generally at 12, is mounted on the case 11. The shift lever and dome assembly 12 includes a shift lever 13 having an upper end adapted to be grasped and manipulated by an operator of the vehicle in a manner which will be described in detail below. The shift lever 13 further includes a lower end which extends downwardly into the case 11 through an opening 15 formed in the upper surface thereof. An interlock assembly, indicated generally at 16, is also mounted on the case 11. Portions of the interlock assembly 16 cooperate with the lower end of the shift lever 13 for a purpose which will be described in detail below.

Figure 2:
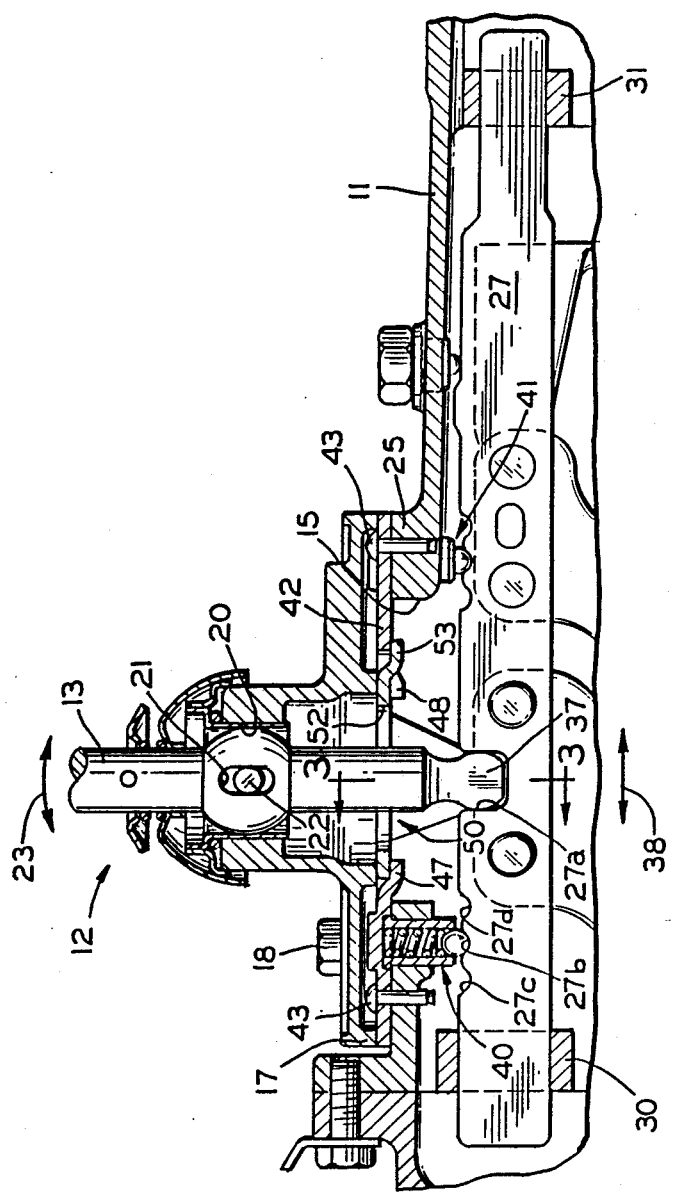
FIG. 2 is a side elevational view, partially in cross section, of a portion of the transmission illustrated in FIG. 1.

The structure of the transmission 10 is more clearly illustrated in FIG. 2. As shown therein, the shift lever and dome assembly 12 includes a dome 17 which is secured to the case 11 about the opening 15 by a plurality of threaded fasteners 18 (only one of which is illustrated in FIG. 2). As shown in FIG. 1, a gasket 19 is interposed between the dome 17 and the case 11. The gasket 19 is omitted from the other drawings for clarity. An opening 20 is formed through the dome 17, through which the shift lever 13 extends. Within the dome opening 20, a central portion of the shift lever 13 is formed having an elongated aperture 21 extending therethrough. A pivot pin 22 is mounted in the dome 17 and extends through the aperture 21. As is well known in the art, the aperture 21 and the pin 22 permit the shift lever 13 to pivot about the axis defined by the pivot pin 22 (the shifting axis), as shown by the curved arrow 23 in FIG. 2. The elongated shape of the aperture 21 further permits the shift lever 13 to pivot about an axis which is perpendicular to the pivot pin 22 axis (the selecting axis), as shown by the curved arrow 24 in FIG. 3.

The shift lever and dome assembly 12 is mounted on a boss 25 which surrounds the opening 15 formed in the upper portion of the case 11. The opening 15 provides access to a plurality of shift bars 26, 27, and 28 located within the case 11. The shift bars 26, 27, and 28 are disposed in parallel fashion and extend longitudinally through the case 11. Each of the three shift bars 26, 27, and 28 is supported at its forward end for sliding movement along its longitudinal axis by a front bushing block 30, which is secured to the transmission case 11. A similar rear bushing block 31 slidably supports the rearward ends of the shift bars 26, 27, and 28.

In the illustrated embodiment, the right shift bar 26 controls the first and reverse gear ratios of the transmission 10 by being movable forwardly and rearwardly from the illustrated central neutral position to respective gear engaging positions. Similarly, the center shift bar 27 controls the second and third gear ratios, and the left shift bar 28 controls the fourth and fifth gear ratios. As will be explained in greater detail below, the engagement of a desired gear ratio is accomplished by initially selecting one of the shift bars 26, 27, or 28 for longitudinal movement, and then moving the selected one of the shift bars 26, 27, or 28 either forwardly or rearwardly from the central neutral position into one of the two gear engaging positions controlled thereby.

Positioned adjacent to and spaced apart from the opposite sides of the center shift bar 27 are a pair of interlock connector bars 32 and 33. Positioned on an opposite side of each of the connector bars 32 and 33 from the center shift bar 27 are a pair of stop bars 35 and 36, respectively. The right connector bar 32 and the right stop bar 35 are connected to the right shift bar 26 for movement together. Similarly, the left connector bar 33 and the left stop bar 36 are connected to the left shift bar 28 for movement together.

Figure 3:
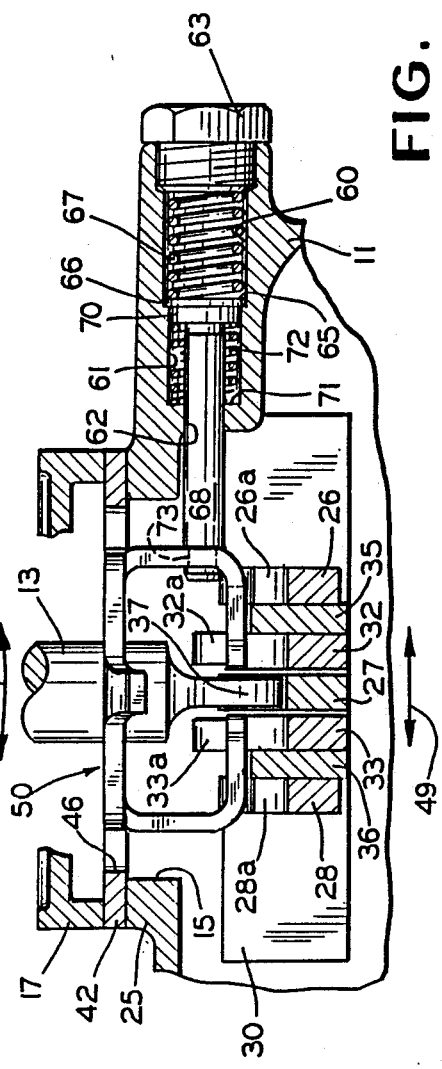
FIG. 3 is a sectional end elevational view taken along line 3—3 of FIG. 2.

A notch 27a is formed in the center shift bar 27, while recessed areas 26a and 28a are formed in the right and left shift bars, respectively. The notch 27a has a relatively short axial length along the center shift bar 27, while the recessed areas 26a and 28a have relatively long axial lengths. Similarly, notches 32a and 33a having relatively short axial lengths are formed in each of the connector bars 32 and 33. The connector bar notches 32a and 33a are aligned with the notch 27a formed in the center shift bar 27. The lower end of the shift lever 13 terminates in a tang portion 37 which, as best shown in FIG. 3, normally extends into the notch 27a formed in the center shift bar 27.

As will be explained in greater detail below, the shift lever 13 must be moved sequentially about the selecting and shifting axes in order for the transmission 10 to provide a desired gear ratio. Movement about the selecting axis is, as mentioned above, defined by the pivoting movement of the shift lever 13 about the axis which is perpendicular to the axis defined by the pivot pin 22, as shown by the curved arrow 24 in FIG. 3. When the shift lever 13 is initially pivoted about the selecting axis, the tang portion 37 of the shift lever 13 moves out of the notch 27a formed in the center shift bar 27 into either of the notches 32a or 33a formed in the connector bars 32 or 33, respectively, depending upon which direction the shift lever 13 is pivoted. The stop bars 35 and 36 limit the amount by which the shift lever 13 may be initially pivoted in these directions. Of course, the shift lever 13 may remain in the illustrated position in order to select the center shift bar 27. Thus, it can be seen that movement of the shift lever 13 about the selecting axis operates to select one of the three shift bars 26, 27, or 28 for subsequent operation.

Once a single one of the shift bars 26, 27, or 28 has been selected, the shift lever 13 is then moved about the shifting axis so as to move the selected shift bar into one of its two gear engaging positions. Movement about the shifting axis is, as mentioned above, defined by the pivoting movement of the shift lever 13 about the axis defined by the pivot pin 22, as shown by the curved arrow 23 in FIG. 2). When the shift lever 13 is subsequently pivoted about the shifting axis, the tang portion 37 of the shift lever 13 engages the shift bar 26, 27, or 28 of whichever notch 32a, 27a, or 33a, respectively, it has previously been moved into. Further movement of the shift lever 13 moves the selected shift bar 26, 27, or 28 longitudinally in either a forward direction or a rearward &0 direction, as shown by the straight arrow 38 in FIG. 2.

For example, if the tang 37 is initially positioned in the notch 32a formed in the right connector bar 32, then the subsequent pivoting of the shift lever 13 about the shifting axis will cause the right connector bar 32, the right stop bar 35, and the right shift bar 28 to be moved longitudinally forwardly or rearwardly, depending upon which direction the shift lever 13 is pivoted. Similar movements of the center shift bar 27 and the left shift bar 28 are attained by initially selected such shift bars 27 and 28 for movement. Thus, the transmission 10 may be used to select any one of six different gear engaging positions for use.

As shown in FIG. 2, the shift bars 26, 27, and 28 are all shown in the central neutral (or non-gear engaging) positions. With respect to the center shift bar 27, a spring-loaded ball bearing detent, indicated generally at 40, is mounted within the transmission case 11. The detent 40 extends downwardly into engagement with a central depression 27b formed in the forward end of the center shift bar 27. When the shift lever 13 is pivoted about the shifting axis such that center shift bar 27 is moved in a rearward direction, the detent 40 will engage a forward depression 27c to maintain the center shift bar 27 in its rearward position. Conversely, if the center shift bar 27 is moved in a forward direction, the detent 40 will engage a rearward depression 27d to maintain the center shift bar 27 in its forward position. Similar detents 41 (only one is illustrated) are provided for the other shift bars 26 and 28.

A mounting plate 42 is attached to the transmission case 11 by a plurality of threaded fasteners 43 (FIG. 2). As shown in FIG. 1, a gasket 45 is interposed between the dome 17 and the case 11. The gasket 45 is omitted from the other drawings for clarity. The peripheral edge of the mounting plate 42 extends around and rests upon the boss 25 An opening 46 is formed through the central portion of the mounting plate 42. As best shown in FIGS. 1 and 2, a curved lip 47 is formed along the forward edge of the opening 46. The lip 47 extends rearwardly and downwardly within the opening 46. A pair of spaced apart curved projections 48 are formed on the rearward edge of the opening 46. The projections 48 extend forwardly and downwardly within the opening 46. The lip 47 and the projections 48 are provided to support and guide an interlock bracket, indicated generally at 50, for sliding movement within the opening 46 formed in the mounting plate 42. Such sliding movement is from side to side within the transmission 10, as indicated by the straight arrow 49 in FIG. 3.

Figure 4:
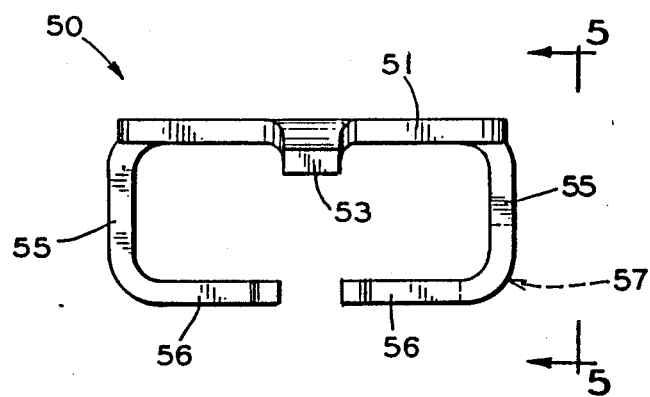
FIG. 4 is an end elevational view of the interlock illustrated in FIGS. 1, 2, and 3.
Figure 5:
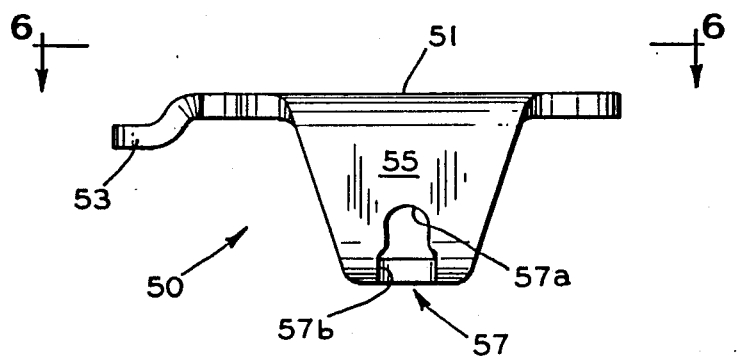
FIG. 5 is a side elevational view of the interlock taken along line 5—5 of FIG. 4.
Figure 6:
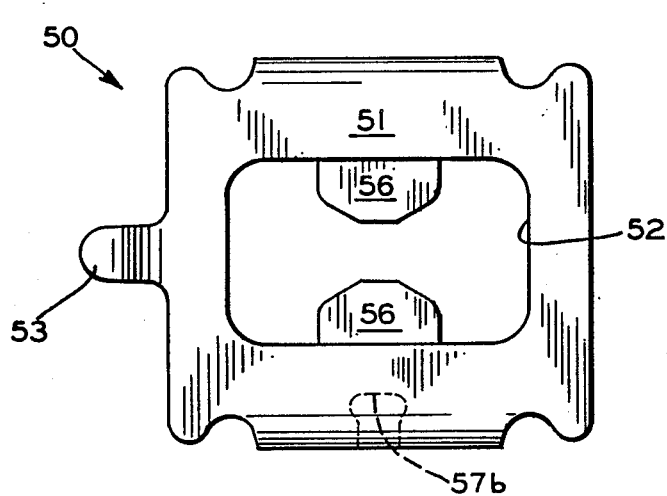
FIG. 6 is a top plan view of the interlock taken along line 6—6 of FIG. 4.

The structure of the interlock bracket 50 is more clearly illustrated in FIGS. 4, 5, and 6. The interlock bracket 50 includes generally flat top portion 51 having an opening 52 formed therethrough. A curved projection 53 extends downwardly and rearwardly from the rear edge of the top portion 51. As best shown in FIG. 2, the forward and rearward edges of the top portion 51 rest upon the lip 47 and the projections 48, respectively, of the mounting plate 42 to support the interlock bracket 50 thereon. The projection 53 of the interlock bracket 50 extends downwardly and rearwardly between the two downwardly and forwardly extending projections 48 formed on the mounting plate 42.

A pair of opposed C-shaped arms 55 are formed integrally with and depend downwardly from the top portion 51. End portions 56 of the C-shaped arms 55 extend inwardly toward one another parallel to and below the top portion 51. A slot, indicated generally at 57, is formed through the lower side portion of one of the C-shaped arms 55. An upper portion 57a of the slot is formed having a smaller width than a lower portion 57b thereof, for a purpose which will be described below.

When assembled as shown in the drawings, the end portions 56 of the C-shaped arms 55 terminate adjacent opposite sides of the center shift bar 27 in the area of the notch 27a. One of the end portions 56 extends through the recessed area 26a formed in the right shift bar 26 into the notch 32a formed in the right connector bar 32, while the other of the end portions 56 extends through the recessed area 28a formed in the left shift bar 28 into the notch 33a formed in the left connector bar 33. Thus, when the shift lever 13 is positioned such that the tang 37 engages the center shift bar 27, the end portions 56 of the arms 55 of the interlock bracket 50 engage the right and left shift bars 26 and 28 so as to prevent them from being moved out of their central neutral positions.

As shown in FIGS. 2 and 3, the lower end of the shift lever 13 extends through the opening 52 formed in the interlock bracket 50 such that the tang portion 37 thereof extends downwardly into the notch 27a formed in the center shift bar 27. The width of the opening 52 is only slightly larger than the outer diameter of the shift lever 13. Thus, because the interlock bracket 50 is supported on the mounting plate 42 for side to side sliding movement, as discussed above, the initial pivoting movement of the shift lever 13 about the selecting axis described above causes the interlock bracket 50 to move linearly from side to side, as shown by the straight arrow 49 in FIG. 3. However, the opening 52 in the interlock bracket 50 is elongated from front to rear. Thus, when the shift lever 13 is subsequently pivoted about the shifting axis, the interlock bracket 50 does not move linearly forwardly or rearwardly.

For example, when the shift lever 13 moved such that the tang 37 engages the right shift bar 26, the interlock bracket 50 is also moved such that the left end portion 56 thereof engages both the left and center shift bars 28 and 27, thereby preventing them from being moved out of their &0 central neutral positions. Similarly, when the shift lever 13 is moved such that the tang 37 engages the left shift bar 28, the interlock bracket 50 is also moved such that right end portion 56 thereof engages both the center and right shift bars 27 and 26, thereby preventing them from being moved out of their neutral positions. As shown in FIG. 3, when the tang 37 of the shift lever 13 is positioned to engage the center shift bar 27, the right and left end portions of the interlock bracket 50 engage the right and left shift bars 26 and 28, respectively, thereby preventing them from being moved out of their neutral positions.

Referring now to FIG. 3, it can be seen that an aperture is formed through the transmission case 11 in a direction which is transverse to the axes defined by the shift bars 26, 27, and 28. As it extends inwardly from the outer surface of the case 11, the aperture has first larger diameter portion 60, a second intermediate diameter portion 61, and a third smaller diameter portion 62. A plug 63 is provided to close the outer end of the larger diameter portion 60. A shoulder 65 is defined at the junction of the larger diameter portion 60 with the intermediate diameter portion 61. An annular washer 66 is urged into contact with the shoulder 65 by a relatively large spring 67 disposed within the larger diameter portion 60 of the aperture The large spring 67 extends between the plug 63 and the washer 66.

An interlock pin 68 extends through the intermediate diameter portion 61 and the smaller diameter portion 62 of the aperture into the interior of the case 11. The outer diameter of the interlock pin 68 is slightly smaller than the inner diameter of the smaller diameter portion 62 of the aperture such that the interlock pin 68 is journalled therein for axial movement. The end of the interlock pin 8 which is disposed in the intermediate diameter portion 1 of the aperture has an enlarged head 70. The outer diameter of the head 70 is slightly smaller than the inner diameter of the intermediate diameter portion 61 of the aperture such that the interlock pin 68 is also journalled therein for axial movement.

A shoulder 71 is defined at the junction of the intermediate diameter portion 61 with the smaller diameter portion 62. A relatively small spring 72 is disposed about the interlock pin 68 within the intermediate diameter portion 60 of the aperture. The small spring 72 extends between the enlarged head 70 of the interlock pin 68 and the shoulder 71, thereby urging the head 70 into contact with the washer 66. Because the force exerted by the large spring 67 against the washer 66 is greater than the force exerted by the small spring 72 against the head 70, the washer 66 normally remains in contact with the shoulder 65, while the enlarged head 70 of the interlock pin 68 normally remains in contact with the washer 66.

Adjacent to the end of the interlock pin 68 opposite to the enlarged head 70, a reduced diameter neck 73 is formed. As best shown in FIG. 3, the neck 73 is received in the smaller width upper portion 57a of the slot 57 formed in the interlock bracket 50. When so received, the interlock pin 68 is connected to the interlock bracket 50. Thus, the interlock pin 68 moves axially within the aperture when the interlock bracket 50 is moved by the initial pivoting of the shift lever 13 about the selecting axis, as described above.

The connection of the interlock pin 68 to the interlock bracket 50 can be easily accomplished by first inserting the interlock pin 68 within the aperture through the case 11, along with the springs 67 and 72, the washer 66, and the plug 63 as illustrated. Then, the interlock bracket 50 is moved downwardly through the opening 46 formed through the mounting plate 42 such that the end of the interlock pin 68 is received within the larger width lower portion 57b of the slot 57. Further downward movement of the interlock bracket 50 (until it engages and rests upon the mounting plate 42) causes the smaller width upper portion 57a of the slot 57 to be moved over the neck 73. Since the outer diameter of the interlock pin 68 is greater than the smaller width upper portion 57a of the slot 57, the interlock pin 68 is connected to the interlock bracket 50 for movement therewith.

As mentioned above, the force exerted by the large spring 67 against the washer 66 urges the washer 66 to normally remain in contact with the shoulder 65, while the force exerted by the small spring 72 against the head 70 urges the head to normally remain in contact with the washer 66. The axial length of the interlock pin 68 is such that when the washer 66 and the head 70 are maintained in this position by the springs 67 and 72, the interlock bracket 50 is centered about the three shift bars 26, 27, and 28, as shown in FIG. 3. As a result, the tang 37 of the shift lever 13 is positioned in the notch 27a of the center shift bar 27. Thus, springs 67 and 72 urge the shift lever 13 toward a centered position relative to the three shift bars 26, 27, and 28.

As previously mentioned, the right shift bar 26 controls the first and reverse gear ratios, the center shift bar 27 controls the second and third gear ratios, and the left shift bar 28 controls the fourth and fifth gear ratios of the transmission. In order for the vehicle to smoothly accelerate after having been stopped, the shift lever 13 is initially pivoted about the selecting axis by the operator so as to move the tang 37 into the notch 32a in the right connector bar 32. The right connector bar 32 is, as discussed above, connected to the right shift bar 26 which controls the first gear ratio of the transmission. When the shift lever 13 is so moved, the interlock bracket 50 is moved toward the right (when viewing FIG. 3) so as to block movement of the center and left shift bars 27 and 28 as previously described.

The movement of the interlock bracket 50 toward the right causes the interlock pin 68 to move axially toward the right through the aperture. As a result, the head 70 moves the washer 66 toward the right so as to compress the large spring 67 within the larger diameter portion 60 of the aperture Such compression resists the movement toward the right of the not only the interlock pin 68, but also the interlock bracket 50 and the shift lever 13. Consequently, the operator of the vehicle must exert a sufficient force to overcome the urging of the large spring 67 in order to complete the desired movement of the shift lever 13. The compression of the large spring 67 in this manner provides tactile feedback to the operator that the shift lever 13 is moving toward the desired position. Since the spring 67 is relatively large, the magnitude of this tactile feedback is also relatively large.

After using the first gear ratio of the transmission, the operator will next move the shift lever 13 back toward the centered position illustrated in FIG. 3 in order to use the second and third gear ratios. As the shift lever 13 is so moved, the force exerted by the compressed large spring 67 tends to assist in such movement until the washer 66 engages the shoulder 65. When it does, the tang 37 of the shift lever is positioned within the notch 27a of the center shift bar 27. As will be explained below, further movement of the shift lever 13 is resisted by the smaller spring 72. Thus, the operator will feel that the shift lever 13 moves very easily back toward the centered position, and further that the shift lever 13 tends to remains in that centered position once it has been reached.

In order to use the fourth and fifth gear ratios, the operator will next move the shift lever 13 so as to position the tang 37 into the notch 33a in the left connector bar 33. When the shift lever 13 is so moved, the interlock bracket 50 is moved toward the left (when viewing FIG. 3) so as to block movement of the right and center shift bars 26 and 27 as previously described. The movement of the interlock bracket 50 causes the interlock pin 68 to move axially toward the left through the aperture. As a result, the head 70 compresses the small spring 72 within the intermediate diameter portion 61 of the aperture. Such compression resists the movement toward the left of the interlock pin 68, the interlock bracket 50, and the shift lever 13. Consequently, the operator of the vehicle must exert a sufficient force to overcome the urging of the small spring 71 in order to complete the desired movement of the shift lever 13. The compression of the small spring 71 in this manner also provides tactile feedback to the operator that the shift lever 13 is moving toward the desired position. Since the spring 71 is relatively small, the magnitude of this tactile feedback is less than the magnitude of the tactile feedback generated when the shift lever 13 is moved into engagement with the right shift bar 26.

It can be seen, therefore, that the present invention provides different magnitudes of tactile feedback to the operator of the transmission, enabling the operator to "feel" which of the three shift bars 26, 27, and 28 is engaged for use. Preferably, the magnitude of the spring force generated by the large spring 67 is at least twice the magnitude of the spring force generated by the small spring 72 This differential in spring forces makes the magnitudes of the tactile feedback easily distinguishable by the operator. Even though different spring forces are generated by the springs 67 and 72, the present invention still centers the tang 37 of the shift lever 13 within the notch 27a formed in the center shift bar 27, thus providing a consistent reference point or starting position for the operator.

In accordance with the provisions of the patent statutes, the principle and mode of operation of the present invention have been explained in its preferred embodiment. However, it must be understood that the present invention may be practiced otherwise than as specifically explained and illustrated without departing from its spirit or scope.

What is claimed is:

1. In a vehicle transmission including a housing and a shift lever extending into the housing, a means for urging the shift lever toward a predetermined position within the housing comprising:
   an aperture formed through the housing, said aperture including a first diameter portion and a second diameter portion, a shoulder being defined between said first and second diameter portions;
   a washer disposed in said first diameter portion of said aperture;
   first spring means for urging said washer against said shoulder;
   pin means having a first end thereof disposed in said second diameter portion of said aperture and a second end thereof being connected with the shift lever for movement therewith; and
   second spring means for urging said first end of said pin means against said washer, the shift lever being positioned in the predetermined position when said washer engages said shoulder and said first end of said pin means engages said washer.

2. The invention defined in claim 1 wherein said first diameter portion of said aperture extends through to the exterior of said housing.

3. The invention defined in claim 2 further including plug means secured within said first diameter portion of said aperture adjacent to the exterior of said housing to close said aperture.

4. The invention defined in claim 3 wherein said first spring is disposed in said first diameter portion of said aperture between said plug means and said washer.

5. The invention defined in claim 1 wherein the diameter of said second diameter portion of said aperture is smaller than the diameter of said first diameter portion.

6. The invention defined in claim 1 wherein said first end of said pin means includes an enlarged head for journalling said first end of said pin means for axial movement in said second diameter portion of said aperture.

7. The invention defined in claim 6 wherein said shoulder is a first shoulder, and wherein said aperture further includes a third diameter portion which is smaller in diameter than said second diameter portion, a second shoulder being defined between said second and third diameter portions.

8. The invention defined in claim 7 wherein pin means is journalled for axial movement in said third diameter portion of said aperture.

9. The invention defined in claim 7 wherein said second spring means is disposed about said pin means and extends between said enlarged head of said pin means and said second shoulder for urging said head against said washer.

10. The invention defined in claim 1 wherein said pin means includes a pin having a first end disposed in said second diameter portion of said aperture and a second end connected to a bracket, said bracket being connected to the shift lever for movement therewith.

11. The invention defined in claim 10 wherein said second end of said pin is releasably connected to said bracket.

12. The invention defined in claim 11 wherein said bracket has a slot formed therein having a larger sized portion and a smaller sized portion, and wherein said second end of said pin has a reduced size neck portion defining an end portion cooperable with said bracket slot so as to be releasably securable thereto.

13. In a vehicle transmission including a housing containing a plurality of movable shift bars, a shift lever having a lower end extending into the housing for selecting one of the plurality of shift bars for movement, and an interlock bracket connected to the lower end of the shift lever for permitting movement only of the one shift bar selected for movement by the shift lever, a means for urging the interlock bracket toward a predetermined position relative to the shift bars comprising:
   an aperture formed through the housing, said aperture including a first diameter portion and a second diameter portion, a shoulder being defined between said first and second diameter portions;
   a washer disposed in said first diameter portion of said aperture;
   first spring means for urging said washer against said shoulder;
   pin means having a first end thereof disposed in said second diameter portion of said aperture and a second end thereof being connected to the interlock bracket for movement therewith; and
   second spring means for urging said first end of said pin means against said washer, the interlock bracket being positioned in the predetermined position when said washer engages said shoulder and said first end of said pin means engages said washer.

14. The invention defined in claim 13 wherein said pin means includes a pin having a first end disposed in said second diameter portion of said aperture and a second end connected to the interlock bracket.

15. The invention defined in claim 14 wherein said second end of said pin is releasably connected to the interlock bracket.

16. The invention defined in claim 15 wherein the interlock bracket has a slot formed therein having a larger sized portion and a smaller sized portion and wherein said second end of said pin has a reduced size neck portion defining an end portion cooperable with said interlock bracket slot so as to be releasably securable thereto.

17. The invention defined in claim 13 wherein said first diameter portion of said aperture extends through to the exterior of said housing.

18. The invention defined in claim 17 further including plug means secured within said first diameter portion of said aperture adjacent to the exterior of said housing to close said aperture.

19. The invention defined in claim 18 wherein said first spring is disposed in said first diameter portion of said aperture between said plug means and said washer.

20. The invention defined in claim 13 wherein the diameter of said second diameter portion of said aperture is smaller than the diameter of said first diameter portion.

21. The invention defined in claim 13 wherein said first end of said pin means includes an enlarged head for journalling said first end of said pin means for axial movement in said second diameter portion of said aperture.

22. The invention defined in claim 21 wherein said shoulder is a first shoulder, and wherein said aperture further includes a third diameter portion which is smaller in diameter than said second diameter portion, a second shoulder being defined between said second and third diameter portions.

23. The invention defined in claim 22 wherein pin means is journalled for axial movement in said third diameter portion of said aperture.

24. The invention defined in claim 22 wherein said second spring means is disposed about said pin means and extends between said enlarged head of said pin means and said second shoulder for urging said head against said washer.

* * * * *